(12) United States Patent
Takemori

(10) Patent No.: US 11,964,521 B2
(45) Date of Patent: Apr. 23, 2024

(54) PNEUMATIC TIRE

(71) Applicant: The Yokohama Rubber Co., LTD., Tokyo (JP)

(72) Inventor: Ryohei Takemori, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 295 days.

(21) Appl. No.: 17/309,913

(22) PCT Filed: Dec. 6, 2019

(86) PCT No.: PCT/JP2019/047882
§ 371 (c)(1),
(2) Date: Jun. 29, 2021

(87) PCT Pub. No.: WO2020/144993
PCT Pub. Date: Jul. 16, 2020

(65) Prior Publication Data
US 2022/0063335 A1    Mar. 3, 2022

(30) Foreign Application Priority Data

Jan. 7, 2019  (JP) ................... 2019-000493

(51) Int. Cl.
*B60C 3/04* (2006.01)
*B60C 13/00* (2006.01)
(Continued)

(52) U.S. Cl.
CPC .............. *B60C 3/04* (2013.01); *B60C 13/003* (2013.01); *B60C 11/0083* (2013.01); *B60C 11/01* (2013.01); *B60C 13/002* (2013.01)

(58) Field of Classification Search
CPC . B60C 13/002; B60C 13/003; B60C 11/0083; B60C 11/01; B60C 3/04;
(Continued)

(56) References Cited

U.S. PATENT DOCUMENTS 5,117,886 A * 6/1992 Tokutake .............. B60C 9/0292
152/546
2017/0021677 A1  1/2017 Michelin

FOREIGN PATENT DOCUMENTS

| CN | 102463855 A | 5/2012 |
|---|---|---|
| JP | 55810/1994 | 8/1994 |

(Continued)

*Primary Examiner* — Cedrick S Williams
*Assistant Examiner* — Thomas Frank Schneider
(74) *Attorney, Agent, or Firm* — Thorpe North & Western

(57) ABSTRACT

A pneumatic tire includes a tread development width TDW in a tread portion and a tire maximum width SW which satisfy 0.70≤TDW/SW≤0.75. A profile line forming an outer surface of a sidewall portion in a tire meridian cross-section includes at least three arcs having mutually different radii of curvature. In the profile line, a radius of curvature R1 of an arc from a first point to a second point, a radius of curvature R2 of an arc from the second point to a tire maximum width position, and a radius of curvature R3 of an arc forming a portion on an inner side in the tire radial direction from the tire maximum width position satisfy R1>R2>R3. A height SDH in the tire radial direction from a bead heel to the tire maximum width position and a tire cross-sectional height SH satisfy 0.47≤SDH/SH≤0.50.

6 Claims, 2 Drawing Sheets

(51) Int. Cl.
*B60C 11/00* (2006.01)
*B60C 11/01* (2006.01)

(58) Field of Classification Search
CPC ............... B60C 2015/061; B60C 9/28; B60C 2009/283; B60C 2011/0016
See application file for complete search history.

(56) References Cited

FOREIGN PATENT DOCUMENTS

| | | | |
|---|---|---|---|
| JP | 7-276928 A | | 10/1995 |
| JP | H08337101 A | * | 12/1996 |
| JP | 2001-30707 A | | 2/2001 |
| JP | 2009-279954 A | | 12/2009 |
| JP | 2015-54528 A | | 3/2015 |
| JP | 2015-150983 A | | 8/2015 |
| JP | 2017-193310 A | | 10/2017 |
| WO | 2014/072279 A1 | | 5/2014 |

* cited by examiner

PNEUMATIC TIRE

TECHNICAL FIELD

The present technology relates to a pneumatic tire and particularly relates to a pneumatic tire that can improve durability against pinch cuts without a significant increase in tire weight.

BACKGROUND ART

When pneumatic tires are used on roads that are not sufficiently paved, durability against external damage is one indicator of tire performance. More specifically, durability is required against so-called pinch cuts in which when a tire rides across a step on a road surface such as a curb or a pothole, a tire side portion is pushed up and sandwiched between a projection on the road surface and a rim flange thereby breaking a carcass layer.

In contrast, although a reinforcing layer has been placed on a sidewall portion and a rubber gauge has been thickened, the side stiffness of the tire becomes excessively high and the tire weight becomes too heavy. Accordingly, in recent years, there has been proposed a technique in which a plurality of band-shaped projections extending in a direction orthogonal to the tire circumferential direction are formed on an outer wall of the sidewall portion at predetermined intervals with respect to the tire circumferential direction, and damage from external obstacles is prevented by the projections (see, for example, Japan Patent Publication No. 2009-279954). However, in such a tire structure, since the amount of rubber tends to increase due to the projections provided on the sidewall portion, there is a problem that the tire weight increases accordingly. In addition, a reduction in the tire weight is required in order to reduce the rolling resistance of the tire, but the tire structure described above is disadvantageous in the weight reduction.

SUMMARY

The present technology provides a pneumatic tire that can improve durability against pinch cuts without a significant increase in tire weight.

A pneumatic tire according to an embodiment of the present technology includes: a tread portion extending in a tire circumferential direction and having an annular shape; a pair of sidewall portions disposed on both sides of the tread portion; and a pair of bead portions disposed on an inner side in a tire radial direction of the pair of sidewall portions, at least one carcass layer formed by arranging a plurality of carcass cords in a radial direction being mounted between the pair of bead portions, a tread development width TDW in the tread portion and a tire maximum width SW satisfying a relationship of $0.70 \leq TDW/SW \leq 0.75$, in a tire meridian cross-section, when a profile line forming an outer surface of the sidewall portions includes at least three arcs having mutually different radii of curvature, an end point of the tread development width TDW is a point P1, and an end point of a tread pattern on an outer surface of the sidewall portions is a point P2, a radius of curvature R1 of an arc from the point P1 to the point P2, a radius of curvature R2 of an arc from the point P2 to a tire maximum width position, and a radius of curvature R3 of an arc forming a portion on an inner side in the tire radial direction from the tire maximum width position satisfying a relationship of $R1>R2>R3$ in the profile line, and a height SDH in the tire radial direction from a bead heel of the bead portions to the tire maximum width position and a tire cross-sectional height SH satisfying a relationship of $0.47 \leq SDH/SH \leq 0.50$.

In the present technology, the tread development width TDW in the tread portion and the tire maximum width SW satisfy the relationship of $0.70 \leq TDW/SW \leq 0.75$. Accordingly, as compared with a known pneumatic tire, since the periphery in the flex zone (deflection region of the sidewall portion) having excellent flexibility can be increased, the maximum amount of deflection can be increased. Further, the profile line forming the outer surface of the sidewall portion is composed of at least three arcs having mutually different radii of curvature. In this profile line, since the radius of curvature R1 of the arc from the point P1 to the point P2, the radius of curvature R2 of the arc from the point P2 to the tire maximum width position, and the radius of curvature R3 of the arc forming a portion on the inner side in the tire radial direction from the tire maximum width position satisfy the relationship of $R1>R2>R3$, the vertical stiffness at a high load can be improved without changing the tire structure. Further, since the height SDH in the tire radial direction from the bead heel of each of the pair of the bead portion to the tire maximum width position and the tire cross-sectional height SH satisfy the relationship of $0.47 \leq SDH/SH \leq 0.50$, the vertical stiffness can be further improved without changing the tire structure. As described above, according to the structure of the pneumatic tire according to an embodiment of the present technology, the durability against pinch cuts can be improved without a significant increase in tire weight.

In the present technology, preferably, a distance L in the tire radial direction from a tire maximum outer diameter position to the point P2 and the tire cross-sectional height SH satisfy a relationship of $0.17 \leq L/SH \leq 0.27$. Accordingly, the durability against pinch cuts can be effectively improved.

In the present technology, preferably, a bead filler is disposed on an outer circumferential side of each of bead cores in the bead portions, and a height BH in the tire radial direction from the bead heel of the bead portions to an outer end in the tire radial direction of the bead filler and the tire cross-sectional height SH satisfy a relationship of $0.18 \leq BH/SH \leq 0.30$. Accordingly, the durability against pinch cuts can be effectively improved without increasing the tire weight.

In the present technology, preferably, the carcass layer is turned up around a bead core of each of the bead portions from a tire inner side to a tire outer side, and an end of the carcass layer located on an innermost side in the tire radial direction of the tread portion is disposed within a region inside the tire corresponding to the radius of curvature R2. Accordingly, the durability against pinch cuts can be effectively improved.

In the present technology, each dimension is measured with the tire mounted on a regular rim and inflated to the regular internal pressure. "Regular rim" is a rim defined by a standard for each tire according to a system of standards that includes standards on which tires are based, and refers to a standard rim in the case of JATMA (The Japan Automobile Tyre Manufacturers Association, Inc.), refers to a "Design Rim" in the case of TRA (The Tire and Rim Association, Inc.), and refers to a "Measuring Rim" in the case of ETRTO (The European Tyre and Rim Technical Organisation). "Regular internal pressure" is an air pressure defined by standards for each tire according to a system of standards that includes standards on which tires are based, and refers to a maximum air pressure in the case of JATMA, refers to the maximum value in the table of "TIRE LOAD LIMITS AT VARIOUS COLD INFLATION PRESSURES"

in the case of TRA, and refers to the "INFLATION PRESSURE" in the case of ETRTO.

DETAILED DESCRIPTION

Figure 1:
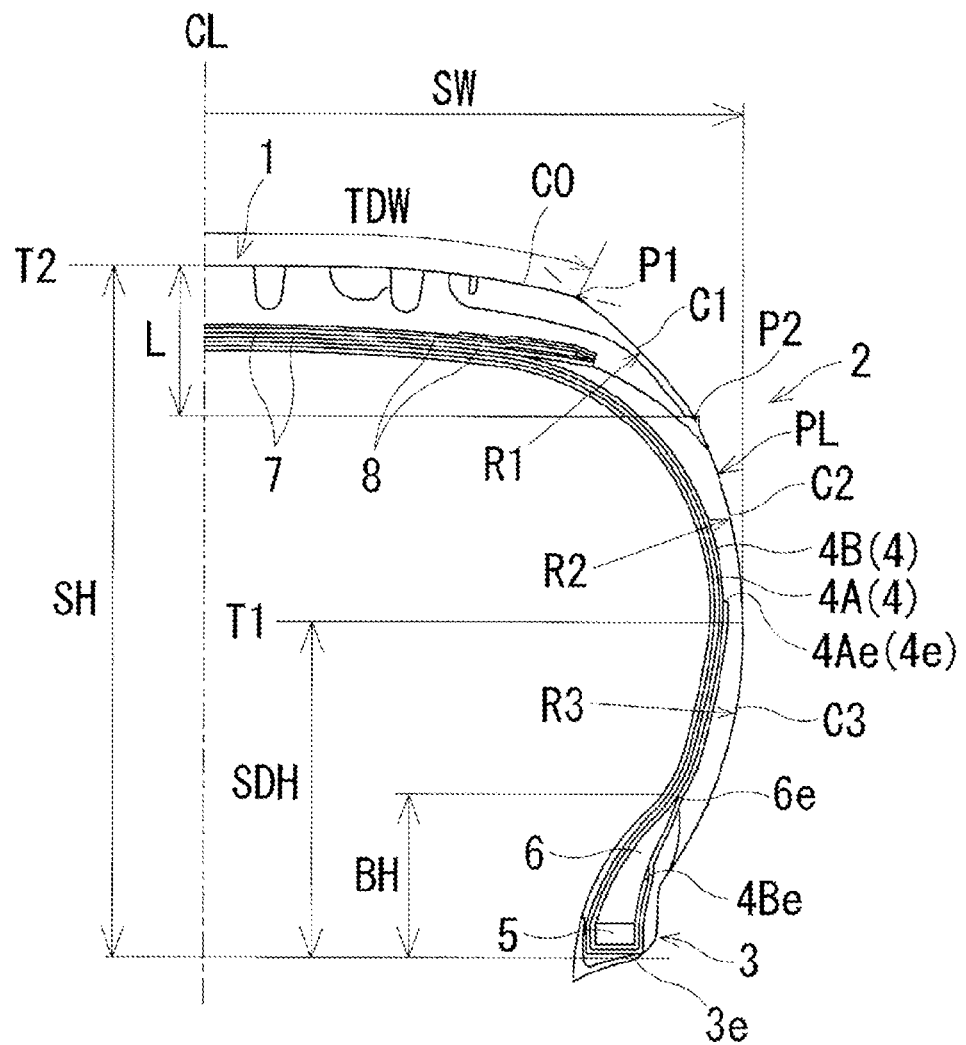
FIG. 1 is a meridian half cross-sectional view illustrating an example of a pneumatic tire according to an embodiment of the present technology.
Figure 2:
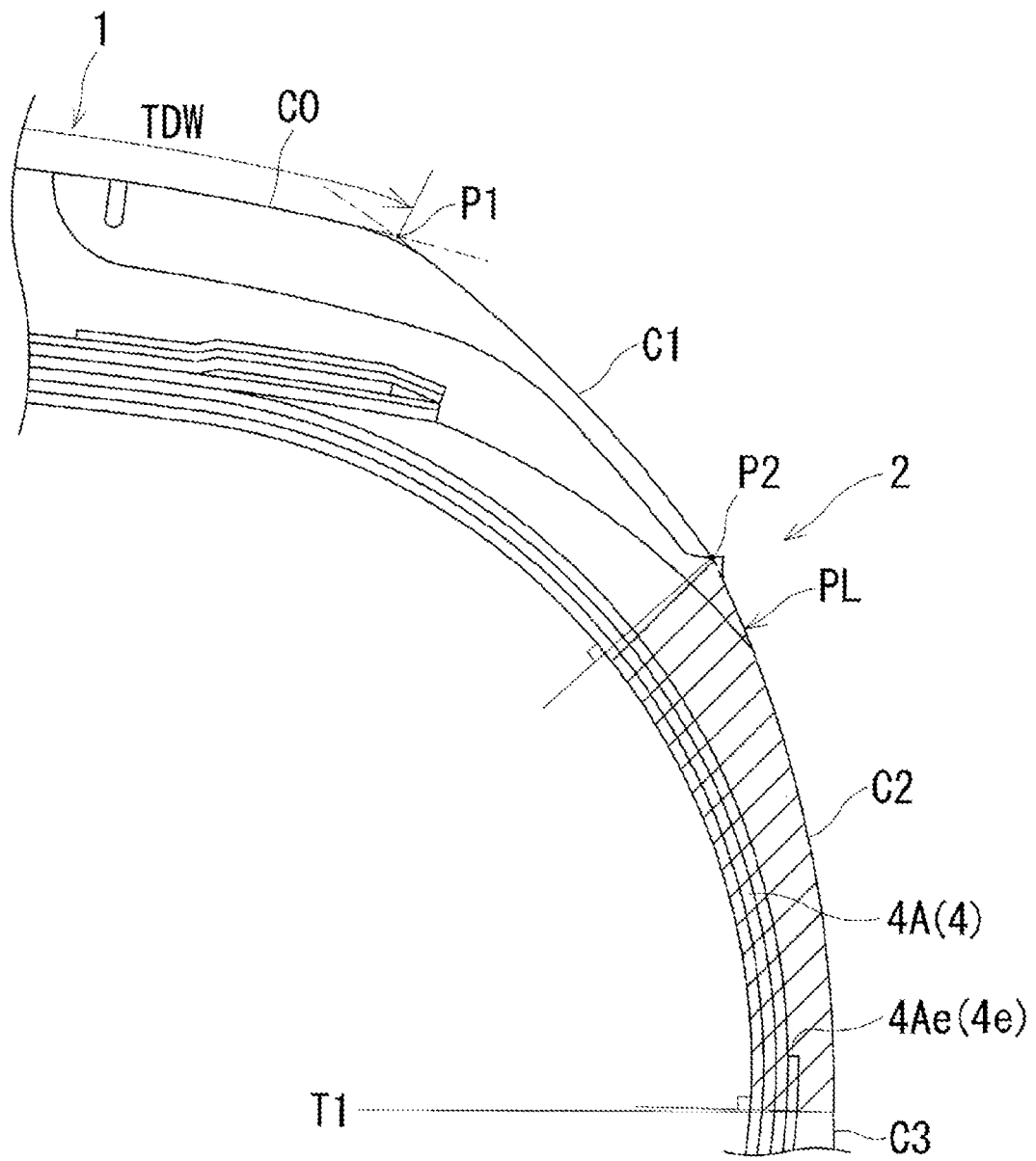
FIG. 2 is an enlarged cross-sectional view illustrating a portion of the pneumatic tire of FIG. 1.

Configurations of embodiments of the present technology will be described in detail below with reference to the accompanying drawings. FIGS. 1 and 2 illustrate an example of a pneumatic tire according to an embodiment of the present technology.

As illustrated in FIG. 1, the pneumatic tire according to the present embodiment includes a tread portion 1 extending in a tire circumferential direction and having an annular shape, a pair of sidewall portions 2 disposed on both sides of the tread portion 1, and a pair of bead portions 3 disposed on an inner side in a tire radial direction of the pair of sidewall portions 2. In FIG. 1, only the half cross-section on one side in a tire width direction delimited by a tire center line CL is illustrated, but the pneumatic tire has a symmetrical structure on both sides of the tire center line CL. Obviously, an asymmetrical structure may be employed.

At least one carcass layer 4 formed by arranging a plurality of carcass cords in the radial direction is mounted between the pair of bead portions 3. Each end portion of the carcass layer 4 is turned up around a bead core 5 disposed in each of the bead portions 3 from a tire inner side to a tire outer side. A bead filler 6 having a triangular cross-sectional shape formed from rubber is disposed on a tire outer circumferential side of each of the bead cores 5. In FIG. 1, the carcass layer 4 has a two-layer structure including a carcass layer 4A located on the inner side in the tire radial direction of the tread portion 1 and a carcass layer 4B located on the outer side in the tire radial direction. An end 4Ae of the carcass layer 4A is disposed on the outer side with respect to a tire maximum width position T1 in the tire radial direction, and an end 4Be of the carcass layer 4B is disposed in the middle of the bead filler 6.

A plurality of belt layers 7 (two layers in FIG. 1) are embedded on a tire outer circumferential side of the carcass layer 4 of the tread portion 1. The belt layers 7 include a plurality of reinforcing cords that are inclined with respect to the tire circumferential direction, and the reinforcing cords are disposed between layers so as to intersect each other. Steel cords are preferably used as the reinforcing cords of the belt layers 7. To improve high-speed durability, at least one belt cover layer 8 (two layers in FIG. 1) formed by being arranged at an angle of 5° or smaller with respect to the tire circumferential direction is disposed on a tire outer circumferential side of the belt layers 7. In FIG. 1, the belt cover layer 8 located on the inner side in the tire radial direction constitutes a full cover that covers the entire width of the belt layers 7, and the belt cover layer 8 located on an outer side in the tire radial direction constitutes an edge cover layer that covers only end portions of the belt layers 7. Organic fiber cords such as nylon and aramid are preferably used as the reinforcing cords of the belt cover layer 8.

Note that the tire internal structure described above represents a typical example for a pneumatic tire, but the pneumatic tire is not limited thereto.

In the pneumatic tire, a profile line PL is a contour line forming the outer surface of the sidewall portion 2 in the tire meridian cross-section. The profile line PL has at least three arcs C. These arcs C have mutually different radii of curvature R, and all of them are arcs having the center on the inner side in the tire radial direction. The profile line PL illustrated in FIG. 1 is composed of three arcs C1 to C3. The profile line PL is a composite arc in which a plurality of arcs C are smoothly connected to each other, and does not include a protrusion portion or a recess portion formed on the outer surface of the sidewall portion 2.

The tread development width TDW is the distance between the points P1 on both sides measured along the contour of the road contact surface of the tread portion 1 when the point P1 is the intersection between an extension line of the arc C0 which is the arc forming the outer surface of the tread portion 1 and is located closest to the sidewall portion 2 in the tire meridian cross-section and an extension line of the arc C1 located closest to the tread portion 1 among the arcs C1 to C3 forming the profile line PL. At this time, the tread development width TDW of the tread portion 1 and the tire maximum width SW satisfy the relationship of $0.70 \leq TDW/SW \leq 0.75$. Further, the height SDH in the tire radial direction from the bead heel 3e of the bead portion 3 to the tire maximum width position T1 and the tire cross-sectional height SH satisfy the relationship of $0.47 \leq SDH/SH \leq 0.50$.

In other words, the point P1 described above is the end point (tread end) of the tread development width TDW. Further, the point P2 is the end point (pattern end) of the tread pattern on the outer surface of the sidewall portion 2. In the profile line PL, the radius of curvature R1 of the arc C1 from the point P1 to the point P2, the radius of curvature R2 of the arc C2 from the point P2 to the tire maximum width position T1, and the radius of curvature R3 of the arc C3 forming a portion on the inner side in the tire radial direction from the tire maximum width position T1 satisfy the relationship of $R1 > R2 > R3$. In particular, the ratio R1/R2 of the radius of curvature R1 to the radius of curvature R2 is preferably in the range from 1.05 to 1.40, and the ratio R2/R3 of the radius of curvature R2 to the radius of curvature R3 is preferably in the range from 1.01 to 1.10. Further, the radius of curvature R1 is more preferably in the range from 100 mm to 120 mm.

The point P2 is the pattern end of the tread pattern on the tire, but in the tire mold, it corresponds to a split position between the sector for molding the tread portion 1 and the side plate for molding the sidewall portion 2. Further, the inner end portion in the tire radial direction of the arc C3 corresponds to a split position between the side plate for molding the sidewall portion 2 and the bead ring for molding the bead portion 3 in the tire mold.

In the pneumatic tire described above, the tread development width TDW in the tread portion 1 and the tire maximum width SW satisfy the relationship of $0.70 \leq TDW/SW \leq 0.75$. Accordingly, as compared with the conventional pneumatic tire, since the periphery in the flex zone (deflection region of the sidewall portion 2) having excellent flexibility can be increased, the maximum amount of deflection can be increased. Further, the profile line PL forming the outer surface of the sidewall portion 2 is composed of at least three arcs C1 to C3 having mutually different radii of curvatures R1 to R3. In this profile line PL, since the radius of curvature R1 of the arc C1 from the point P1 to the point P2, the radius of curvature R2 of the arc C2 from the point P2 to the tire maximum width position T1, and the radius of curvature R3 of the arc C3 forming a portion on the inner side in the tire radial direction from the tire maximum width position T1 satisfy the relationship of R1>R2>R3, the vertical stiffness at a high load can be improved without changing the tire structure. Further, since the height SDH in the tire radial direction from the bead heel 3e to the tire maximum width position T1 and the tire cross-sectional height SH satisfy the relationship of 0.47≤SDH/SH≤0.50, the vertical stiffness can be further improved without changing the tire structure. As described above, according to the structure of the pneumatic tire according to an embodiment of the present technology, the durability against pinch cuts can be improved without a significant increase in tire weight.

In particular, in the case of the embodiment illustrated in FIG. 1, since the profile line PL forming the outer surface of the sidewall portion 2 is composed of three arcs C1 to C3, the profile line PL can be configured with a minimum number of arcs while obtaining the effects described above, which is advantageous from the perspective of productivity. Further, since the carcass layer 4 is composed of two layers, the durability of the tire can be improved, and it is suitable for use on insufficiently paved roads in harsh regions.

Here, when the ratio TDW/SW of the tread development width TDW to the tire maximum width SW is smaller than 0.70, the periphery in the flex zone can be increased, but the tread development width TDW becomes excessively narrow, which is not preferable. When the ratio TDW/SW is larger than 0.75, the maximum amount of deflection in the flex zone decreases, and the durability against pinch cuts cannot be sufficiently secured. Further, when the ratio SDH/SH of the height SDH to the tire cross-sectional height SH is smaller than 0.47, the length of the arc C2 becomes excessively long and the vertical stiffness cannot be appropriately improved. When the ratio SDH/SH is larger than 0.50, the length of the arc C2 cannot be sufficiently secured, and the vertical stiffness tends to decrease.

In the pneumatic tire, the distance in the tire radial direction from the tire maximum outer diameter position T2 to the point P2 is defined as a distance L (see FIG. 1). At this time, the distance L and the tire cross-sectional height SH preferably satisfy the relationship of 0.17≤L/SH≤0.27. By appropriately setting the ratio L/SH of the distance L to the tire cross-sectional height SH in this manner, the durability against pinch cuts can be effectively improved. Here, when the ratio L/SH of the distance L to the tire cross-sectional height SH is smaller than 0.17, the distance in the tire radial direction between the end of the belt layer 7 and the end of the tread rubber layer constituting the tread portion 1 cannot be sufficiently ensured, which is not preferable in terms of production. Conversely, if the ratio L/SH is larger than the 0.27, rolling resistance tends to deteriorate due to an increase in the volume of the tread rubber layer.

Further, the height in the tire radial direction from the bead heel 3e of the bead portion 3 to the outer end 6e of the bead filler 6 in the tire radial direction is defined as the height BH (see FIG. 1). At this time, the height BH and the tire cross-sectional height SH preferably satisfy the relationship of 0.18≤BH/SH≤0.30. By appropriately setting the ratio BH/SH of the height BH to the tire cross-sectional height SH of the height BH in this manner, the durability against pinch cuts can be effectively improved without increasing the tire weight. Here, when the ratio BH/SH of the height BH to the tire cross-sectional height SH is smaller than 0.18, the effect of improving the vertical stiffness at a high load cannot be sufficiently obtained. Conversely, when the ratio BH/SH is larger than 0.30, this is not preferable because the tire weight increases.

Further, the end 4e of the carcass layer 4 located on the innermost side in the tire radial direction of the tread portion 1 is preferably disposed within the region inside the tire corresponding to the radius of curvature R2. The region inside the tire corresponding to the radius of curvature R2 is a region (the region of a hatched portion illustrated in FIG. 2) enclosed by the arc C2 forming the profile line PL, the perpendicular lines drawn from each of both ends of the arc C2 with respect to the tire inner surface, and the tire inner surface in the tire meridian cross-section. In FIG. 2, the end 4Ae of the carcass layer 4A is disposed in the region. By disposing the end 4e of the carcass layer 4 in this manner, the durability against pinch cuts can be effectively improved. Here, when the end 4e of the carcass layer 4 is disposed on the outer side in the tire radial direction beyond the region, it is not preferable because the tire weight increases. Conversely, when the end 4e of the carcass layer 4 does not reach the region and is disposed on the inner side in the tire radial direction with respect to the region, the effect of improving the vertical stiffness at a high load cannot be sufficiently obtained.

In the description, the profile line PL forming the outer surface of the sidewall portion 2 illustrates a pneumatic tire composed of three arcs C1 to C3, but the present technology is not limited to this, and the profile line PL may also be composed of four or more arcs C1 to Cn (n is 4 or greater). For example, when the profile line PL is composed of four arcs C1 to C4, the points P1 and P2 and the arcs C1 and C2 are defined in the same manner as described above, and a point on the profile line PL located at a height that is identical to the height of the outer end 6e in the tire radial direction of the bead filler 6 is defined as a point P3. In this case, the profile line PL is a composite arc including the arc C1, the arc C2, the arc C3 from the tire maximum width position T1 to the point P3, and an arc C4 forming a portion on the inner side in the tire radial direction from the point P3. When the profile line PL is composed of four or more arcs C1 to Cn in this manner, the radii of curvatures R1 to Rn of the arcs C1 to Cn are configured to decrease in order with the radius of curvature R1 as the maximum.

EXAMPLES

Tires according to Conventional Example, Comparative Examples 1 and 2, and Examples 1 to 6 were manufactured. The tires are pneumatic tires having a tire size of 205/65R16, and include a tread portion extending in the tire circumferential direction and having an annular shape, a pair of sidewall portions disposed on both sides of the tread portion, and a pair of bead portions disposed on the inner side in the tire radial direction of these sidewall portions, with at least one carcass layer being mounted between the pair of bead portions. The tires are set for the ratio (TDW/SW) of the tread development width TDW to the tire maximum width SW, the radius of curvature R1, the radius of curvature R2, the radius of curvature R3, the ratio (SDH/SH) of the height SDH to the tire cross-sectional height SH, the ratio (L/SH) of the distance L to the tire cross-sectional height SH, the ratio (BH/SH) of the height BH to the tire cross-sectional height SH, and the position of the end of the carcass layer as indicated in Table 1.

In Table 1, when the position of the end of the carcass layer is "Inside Region", it means that the end of the carcass layer is disposed within the region inside the tire corresponding to the radius of curvature R2. When the position of the end of the carcass layer is "Outside Region", it means that the end of the carcass layer does not reach the region and is disposed on the inner side in the tire radial direction with respect to the region.

For these test tires, durability against pinch cuts and rolling resistance was evaluated by the following test method, and the results are also indicated in Table 1.

Durability Against Pinch Cuts:

Each test tire was assembled on a wheel having a rim size of 16×6J, a running test was carried out under the condition of an air pressure of 230 kPa, and the speed at which the tire burst on the curb was measured. Evaluation results are expressed as index values with the value of the Conventional Example being defined as 100. Larger index values indicate superior durability.

Rolling Resistance:

Each test tire was assembled on a wheel having a rim size of 16×6J, and the rolling resistance was measured using a drum testing machine under the condition of an air pressure of 230 kPa in accordance with ISO (the International Organization for Standardization) 25280. Evaluation results are expressed as index values with the value of the Conventional Example being defined as 100. Larger index values indicate superior rolling resistance.

TABLE 1-1

|  | Conventional Example | Comparative Example 1 | Comparative Example 2 | Example 1 | Example 6 |
|---|---|---|---|---|---|
| Ratio of tread development width TDW to tire maximum width SW (TDW/SW) | 0.76 | 0.72 | 0.72 | 0.72 | 0.72 |
| Radius of curvature R1 (mm) | 68 | 115 | 115 | 115 | 115 |
| Radius of curvature R2 (mm) | 68 | 90 | 115 | 90 | 90 |
| Radius of curvature R3 (mm) | 120 | 90 | 90 | 85 | 85 |
| Ratio of height SDH to tire cross-sectional height SH (SDH/SH) | 0.55 | 0.48 | 0.48 | 0.48 | 0.48 |
| Ratio of distance L to tire cross-sectional height SH (L/SH) | 0.15 | 0.15 | 0.15 | 0.15 | 0.20 |
| Ratio of height BH to tire cross-sectional height SH (BH/SH) | 0.35 | 0.35 | 0.35 | 0.35 | 0.20 |
| Position of end of carcass layer | Outside Region | Outside Region | Outside Region | Outside Region | Inside Region |
| Durability against pinch cuts | 100 | 101 | 101 | 102 | 105 |
| Rolling resistance | 100 | 101 | 101 | 102 | 104 |

TABLE 1-2

|  | Example 2 | Example 3 | Example 4 | Example 5 | Example 6 |
|---|---|---|---|---|---|
| Ratio of tread development width TDW to tire maximum width SW (TDW/SW) | 0.72 | 0.72 | 0.72 | 0.72 | 0.72 |
| Radius of curvature R1 (mm) | 100 | 120 | 115 | 115 | 115 |
| Radius of curvature R2 (mm) | 92 | 87 | 90 | 90 | 90 |
| Radius of curvature R3 (mm) | 90 | 80 | 85 | 85 | 85 |
| Ratio of height SDH to tire cross-sectional height SH (SDH/SH) | 0.48 | 0.48 | 0.48 | 0.48 | 0.48 |
| Ratio of distance L to tire cross-sectional height SH (L/SH) | 0.15 | 0.15 | 0.20 | 0.20 | 0.20 |
| Ratio of height BH to tire cross-sectional height SH (BH/SH) | 0.35 | 0.35 | 0.35 | 0.20 | 0.20 |
| Position of end of carcass layer | Outside Region | Outside Region | Outside Region | Outside Region | Inside Region |
| Durability against pinch cuts | 103 | 103 | 104 | 104 | 105 |
| Rolling resistance | 103 | 103 | 102 | 104 | 104 |

As can be seen from Table 1, the pneumatic tires of Examples 1 to 6 have improved durability against pinch cuts and rolling resistance as compared with Conventional Example.

On the other hand, in Comparative Examples 1 and 2, since the radii of curvatures R1 to R3 do not satisfy the relationship formula defined in the present technology, the effects of improving the durability against pinch cuts and the rolling resistance are not sufficient.

The invention claimed is:

1. A pneumatic tire, comprising:
   a tread portion extending in a tire circumferential direction and having an annular shape;
   a pair of sidewall portions disposed on both sides of the tread portion; and
   a pair of bead portions disposed on an inner side in a tire radial direction of the pair of sidewall portions, at least one carcass layer formed by arranging a plurality of carcass cords in a radial direction being mounted between the pair of bead portions,
   a tread development width TDW in the tread portion and a tire maximum width SW satisfying a relationship of $0.70 \leq TDW/SW \leq 0.75$,
   in a tire meridian cross-section, when a profile line forming an outer surface of the sidewall portions comprises at least three arcs having mutually different radii of curvature, an end point of the tread development width TDW is a point P1, and an end point of a tread pattern on an outer surface of the sidewall portions is a point P2, a radius of curvature R1 of an arc from the point P1 to the point P2, a radius of curvature R2 of an arc from the point P2 to a tire maximum width position, and a radius of curvature R3 of an arc forming a portion on an inner side in the tire radial direction from the tire maximum width position satisfying a relationship of $R1 > R2 > R3$ in the profile line, and
   a height SDH in the tire radial direction from a bead heel of the bead portions to the tire maximum width position and a tire cross-sectional height SH satisfying a relationship of $0.47 \leq SDH/SH \leq 0.50$.

2. The pneumatic tire according to claim 1, wherein a distance L in the tire radial direction from a tire maximum outer diameter position to the point P2 and the tire cross-sectional height SH satisfy a relationship of $0.17 \leq L/SH \leq 0.27$.

3. The pneumatic tire according to claim 1, wherein a bead filler is disposed on an outer radial side of each of bead cores in the bead portions, and a height BH in the tire radial direction from the bead heel of the bead portions to an outer end in the tire radial direction of the bead filler and the tire cross-sectional height SH satisfy a relationship of $0.18 \leq BH/SH \leq 0.30$.

4. The pneumatic tire according to claim 1, wherein the carcass layer is turned up around a bead core of each of the bead portions from a tire inner side to a tire outer side, and an end of the carcass layer located on an innermost side in the tire radial direction of the tread portion is disposed within a region inside the tire corresponding to the radius of curvature R2.

5. The pneumatic tire according to claim 2, wherein a bead filler is disposed on an outer radial side of each of bead cores in the bead portions, and a height BH in the tire radial direction from the bead heel of the bead portions to an outer end in the tire radial direction of the bead filler and the tire cross-sectional height SH satisfy a relationship of $0.18 \leq BH/SH \leq 0.30$.

6. The pneumatic tire according to claim 5, wherein the carcass layer is turned up around the bead core of each of the bead portions from a tire inner side to a tire outer side, and an end of the carcass layer located on an innermost side in the tire radial direction of the tread portion is disposed within a region inside the tire corresponding to the radius of curvature R2.

* * * * *